United States Patent
Liao

(10) Patent No.: US 6,817,260 B2
(45) Date of Patent: Nov. 16, 2004

(54) BALL SCREW WITH COOLING MEANS

(75) Inventor: Chi-Meng Liao, Shituen Chiu Taichung (TW)

(73) Assignee: Hiwin Technologies Corporation, Taichung (TW)

( * ) Notice: Subject to any disclaimer, the term of this patent is extended or adjusted under 35 U.S.C. 154(b) by 0 days.

(21) Appl. No.: 09/986,588

(22) Filed: Nov. 9, 2001

(65) Prior Publication Data

US 2003/0089187 A1 May 15, 2003

(51) Int. Cl.[7] .............................................. F16H 27/02
(52) U.S. Cl. .................................................... 74/89.43
(58) Field of Search ............................... 74/467, 89.44, 74/424.71, 424.81, 424.82, 606 A, 609, 89.43; 184/104.1, 104.3; 165/201, 236

(56) References Cited

U.S. PATENT DOCUMENTS

| | | | | |
|---|---|---|---|---|
| 3,029,792 A | * | 4/1962 | Rasmussen | 91/176 |
| 3,169,407 A | * | 2/1965 | Newell | 74/424.9 |
| 3,667,311 A | * | 6/1972 | Wysong | 74/424.75 |
| 4,074,587 A | * | 2/1978 | Brusasco | 74/424.82 |
| 4,741,221 A | * | 5/1988 | Hudimac, Jr. | 74/424.9 |
| 4,809,824 A | * | 3/1989 | Fargier et al. | 188/72.8 |
| 4,836,042 A | * | 6/1989 | Slocum | 74/89.43 |
| 5,016,335 A | * | 5/1991 | Becker et al. | 29/57 |
| 5,168,767 A | * | 12/1992 | Morita | 74/89.44 |
| 5,291,969 A | * | 3/1994 | Diederich, Jr. | 184/6.22 |
| 5,344,230 A | * | 9/1994 | Kowalczyk et al. | 366/100 |
| 5,704,250 A | * | 1/1998 | Black | 74/89.3 |
| 5,749,266 A | * | 5/1998 | Tsukada | 74/89.44 |
| 5,809,838 A | * | 9/1998 | Miyaguchi et al. | 74/89.44 |
| 6,247,556 B1 | * | 6/2001 | Chen | 184/83 |
| 2002/0152822 A1 | * | 10/2002 | Chuo | 74/89.13 |

FOREIGN PATENT DOCUMENTS

| | | | |
|---|---|---|---|
| DE | 4335654 A1 | * | 4/1995 |
| JP | 5851052 A | * | 3/1983 |

* cited by examiner

*Primary Examiner*—Christopher P. Schwartz
(74) *Attorney, Agent, or Firm*—Dennison, Schultz, Dougherty & MacDonald

(57) ABSTRACT

The cooling means for the present invention is formed in the screw nut instead of forming in the screw bolt. A cavity is formed between an outer cover and the screw nut as a pathway for cooling agent so as to deprive the screw nut of generated heat therein. To assure a better cooling effect, portion of the screw nut adjacent to the outer cover is pared partially to enlarge the space of the cavity therebetween. Furthermore, a guiding tube spirally encircling the screw nut, or reciprocating in the longitudinal direction of the ball screw axis on the screw nut, is provided for guiding the cooling agent therein so as to prevent leaking of cooling agent.

2 Claims, 5 Drawing Sheets

US 6,817,260 B2

BALL SCREW WITH COOLING MEANS

BACKGROUND OF THE INVENTION

1. Field of the Invention

The present invention relates to a ball screw with cooling means and more particularly, a ball screw with high efficiency cooling means.

2. Description of the Prior Art

FIG. 1 shows cooling means for a conventional ball screw. As shown in FIG. 1, a tunnel like through pathway 11 is bored penetrating along the longitudinal direction of a screw bolt 10 so as to provide a path for a cooling liquid thereby carrying away the heat of the screw bolt 10 imparted by the screw nut 12 and the circulating steel balls. It is well known to men skilled in the art that the operating principle of a ball screw and nut assembly is the screw nut 12 engaging a work piece or a working platform moves along the lengthwise direction of the screw bolt 10 by spirally rotation of the screw nut 12 with respect to the screw bolt 10. The screw nut 12 is coaxially sleeving over the screw bolt 10 and both structures are coupled with two threaded grooves each formed on the inner surface of the screw nut 12 and the outer surface of the screw bolt 10 respectively with a plurality of rolling balls interposed therebetween. By so the work piece or the working platform is able to perform its work by moving along the lengthwise direction of the screw bolt 10. In fact, owing to the fact that it is the screw nut 12 that actually carries the load of the work piece or the working platform and always in contact with the rolling balls so that its heat dissipation is difficult. On the contrary, the screw bolt 10 is constructed far longer than the screw nut 12 so that a major part of it is exposed to the air with a good air cool effect. Therefore, to form a cooling agent path along the lengthwise direction of the screw bolt 10 for heat dissipation as that has been commonly practiced in conventional techniques is definitely nonsense as putting the cart before the horse. Besides, forming a through pathway 11 coaxially along the longitudinal direction in a slim screw bolt 10 accurately requires a very fine technique to perform, a slight inadvertent alignment of center position may cause vibration of the screw bolt 10 during operation, or to the worst, result in cracking of the screw bolt 10.

SUMMARY OF THE INVENTION

In view of the foregoing situation, the inventor of the present invention herein conducted intensive research based on many years of experience gained through professional engagement in the manufacturing of related products, with continuous experimentation and improvement culminating in the development of efficient cooling means for ball screw of the invention herein.

Instead of boring a longitudinal through pathway for cooling agent along the screw bolt situated at better cooling condition, a cavity is formed between an outer cover and the screw nut as a pathway for cooling agent so as to deprive the screw nut of heat generated therein. Leak proof means such as several O rings are provided between the outer cover and the screw nut to prevent the cooling agent from leaking out of the cavity. To assure a better cooling effect, portion of the wall of the screw nut adjacent to the outer cover is pared partially in planar or curved surface to enlarge the space of the cavity and reduce the wall thickness of the screw nut thereby improving the cooling effect. Furthermore, a guiding tube spirally encircling the screw nut, or reciprocating in the longitudinal direction of the ball screw axis on the screw nut, is provided for guiding the cooling agent therein so as to prevent leaking of cooling agent.

BRIEF DESCRIPTION OF THE DRAWINGS

The accompanying drawings, which are included to provide a further understanding of the invention and incorporated in and constitute a part of this specification, illustrate embodiments of the invention and together with the description serve to explain the principles of the invention, wherein.

DETAILED DESCRIPTION OF THE PREFERRED EMBODIMENT

Figure 1:
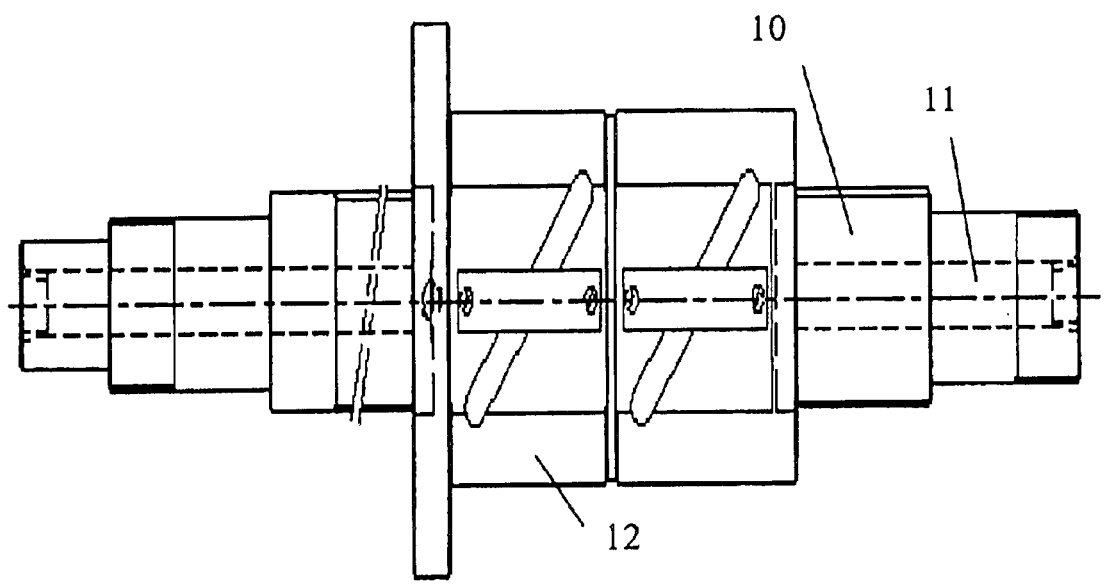
FIG. 1 is a schematic view of cooling means for a conventional ball screw.
Figure 2:
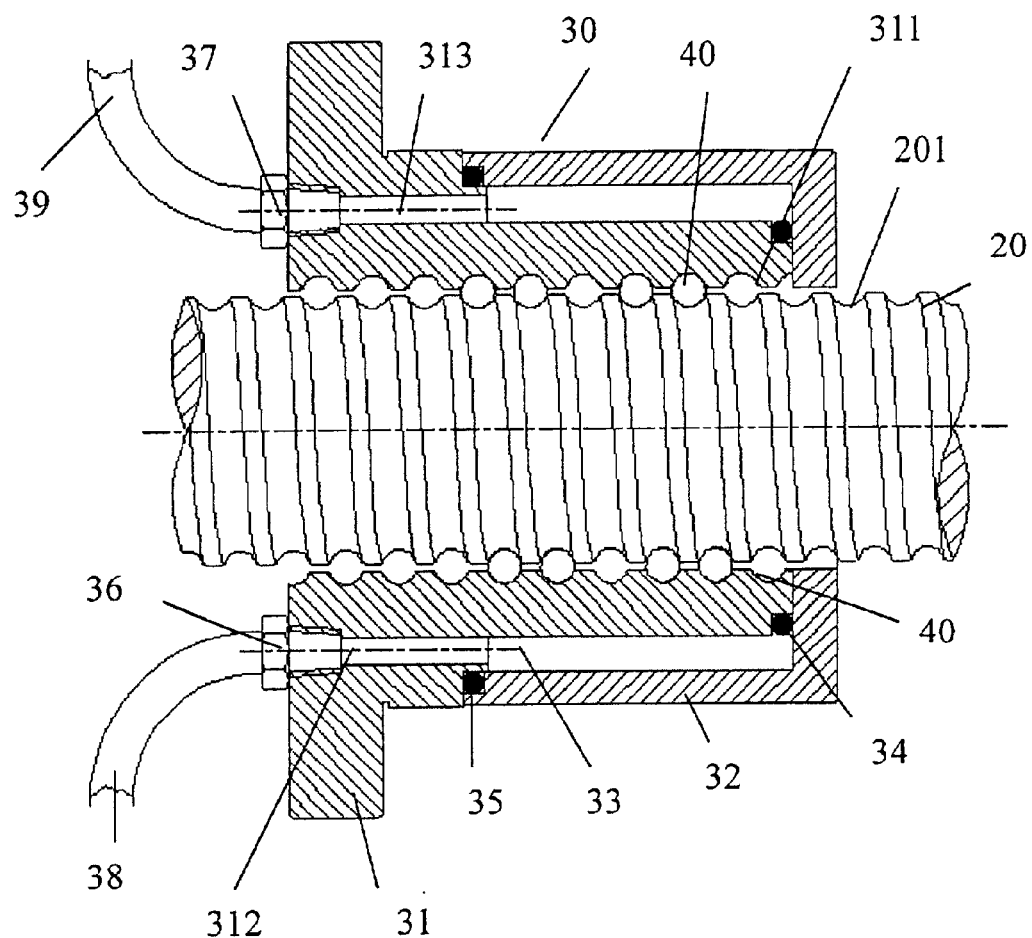
FIG. 2 is a schematic view of a ball screw with cooling means in a first embodiment of the present invention.

FIG. 2 is a schematic view of a ball screw with cooling means in a first embodiment of the present invention. As shown in FIG. 2, the ball screw assembly 30 in this embodiment comprises essentially a screw bolt 20 and a screw nut 31, and a plurality of rolling balls 40 made of steel, or ceramic, or plastics. A spirally threaded groove 201 is formed around outer surface of the screw bolt 20, and another spirally threaded groove 311 corresponding to the former groove 201 is formed around the inner surface of the screw nut 31. The rolling balls 40 interposed between the two grooves 201 and 311 make the screw bolt 20 and the screw nut 31 able to rotate with each other. An outer cover 32 is covering over the screw nut 31 such that a cavity 33 is formed therebetween for a cooling agent to flow through thereby cooling the screw nut 31. In this embodiment, two O rings 34 and 35 are provided between the outer cover 32 and the screw nut 31 to serve as leak proof element for preventing leakage of cooling agent. A cooling agent entrance opening 312 and an exit opening 313 are provided on the screw nut 31, and the openings 312 and 313 are each connected respectively with a pipe coupling 36 and 37, which are further connected respectively to pipes 38 and 39, the pipes 38 and 39 may be hoses or metal pipes. With this structure the cooling agent is flowing into the pipe 38, passing through the coupling 36 entering the cavity 33 from the entrance opening 312, and absorbing the heat from the screw nut 31, and flowing out of the cavity 33 from the exit opening 313, and returning to its source by way of the coupling 37 and the pipe 39 with the absorbed heat so that the ball screw assembly is favorably cooled down.

Figure 3:
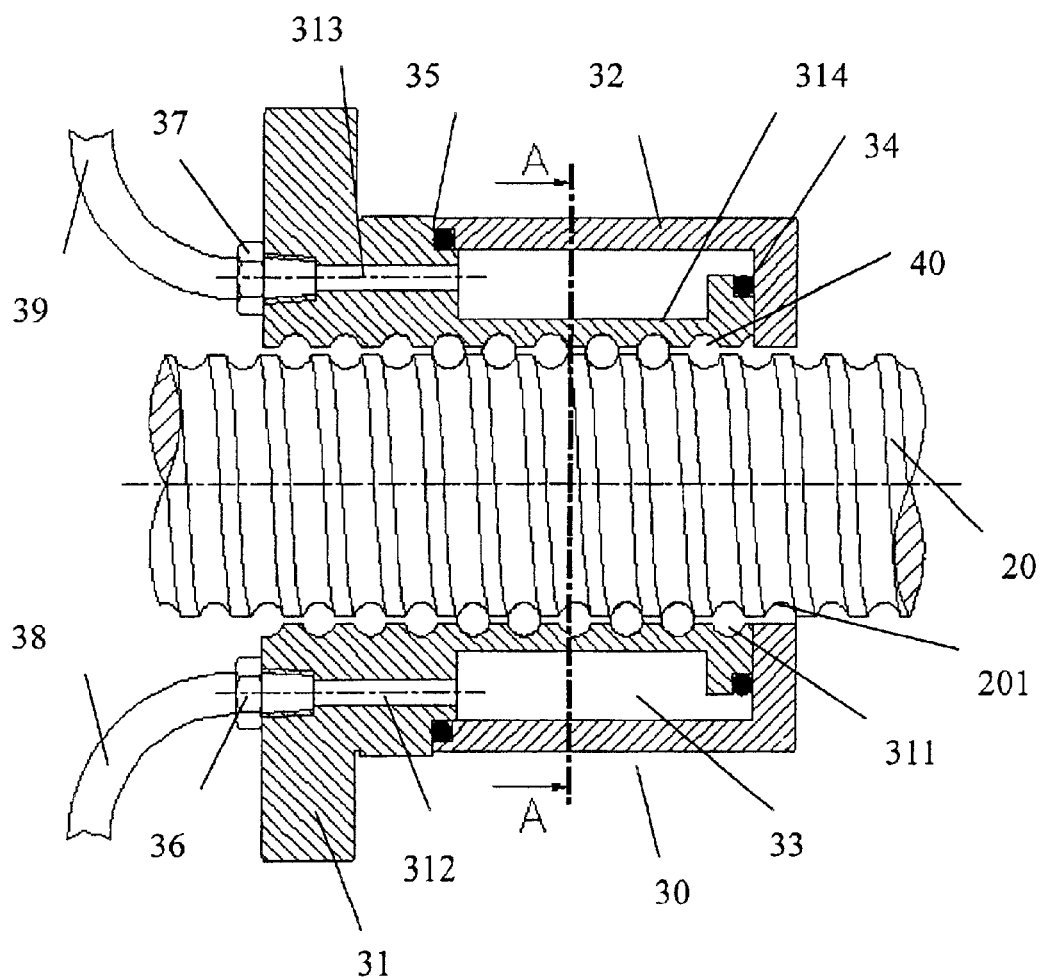
FIG. 3 is a schematic view of a ball screw with cooling means in a second embodiment of the present invention.
Figure 4:
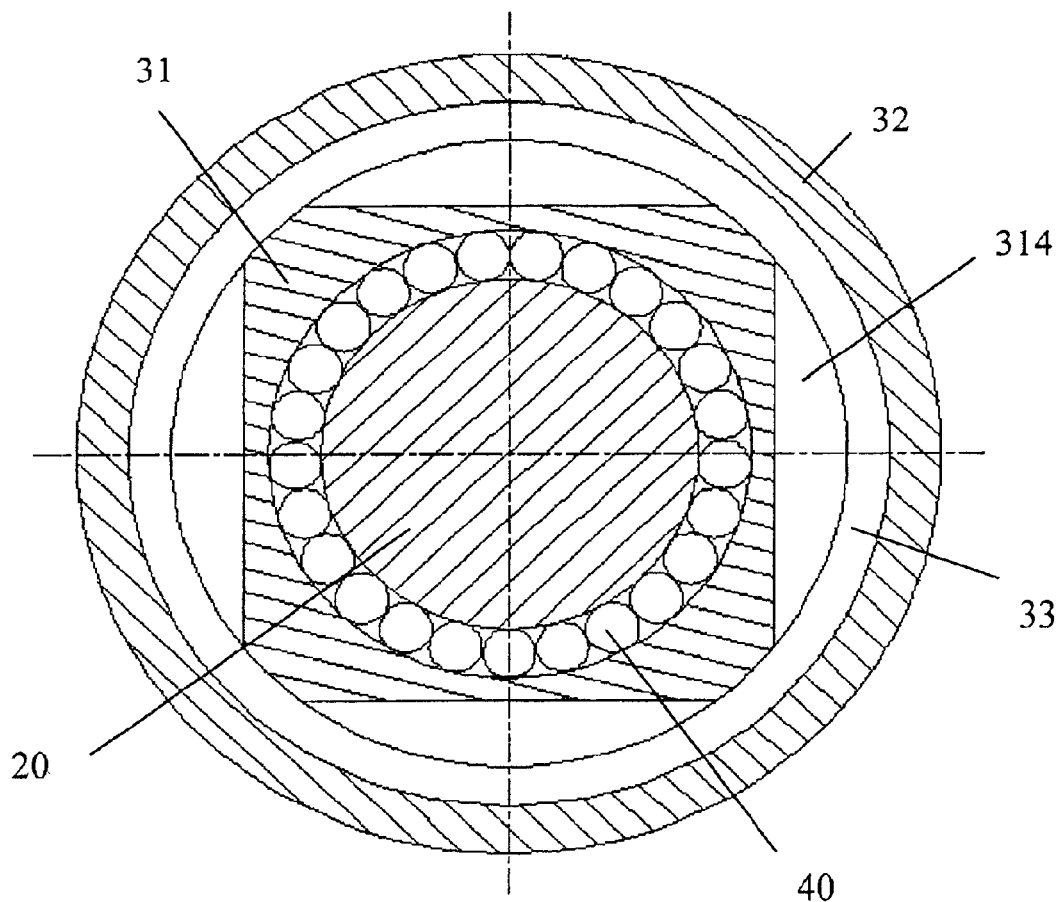
FIG. 4 is a cross sectional view cut along line A—A on FIG. 3.

FIG. 3 is a schematic view of a ball screw with the cooling means in a second embodiment, and FIG. 4 is a cross sectional view cut along line A—A on FIG. 3. In order to further improve cooling effect, a portion of outer wall of the screw nut 31 where influence to function of the ball screw assembly being evaluated to be negligible is partially pared to form an enlarged portion 314 for the cavity 33. Wall of the portion 314 is formed into a planar or a curved surface by paring the screw nut 31 parallel to the longitudinal direction of the screw bolt 20 or in encircling around its transverse direction such that the cooling effect is significantly upgraded owing to reduction of wall thickness of the screw nut 31, and increasing the contact are between the cooling agent and the screw nut 31.

Figure 5:
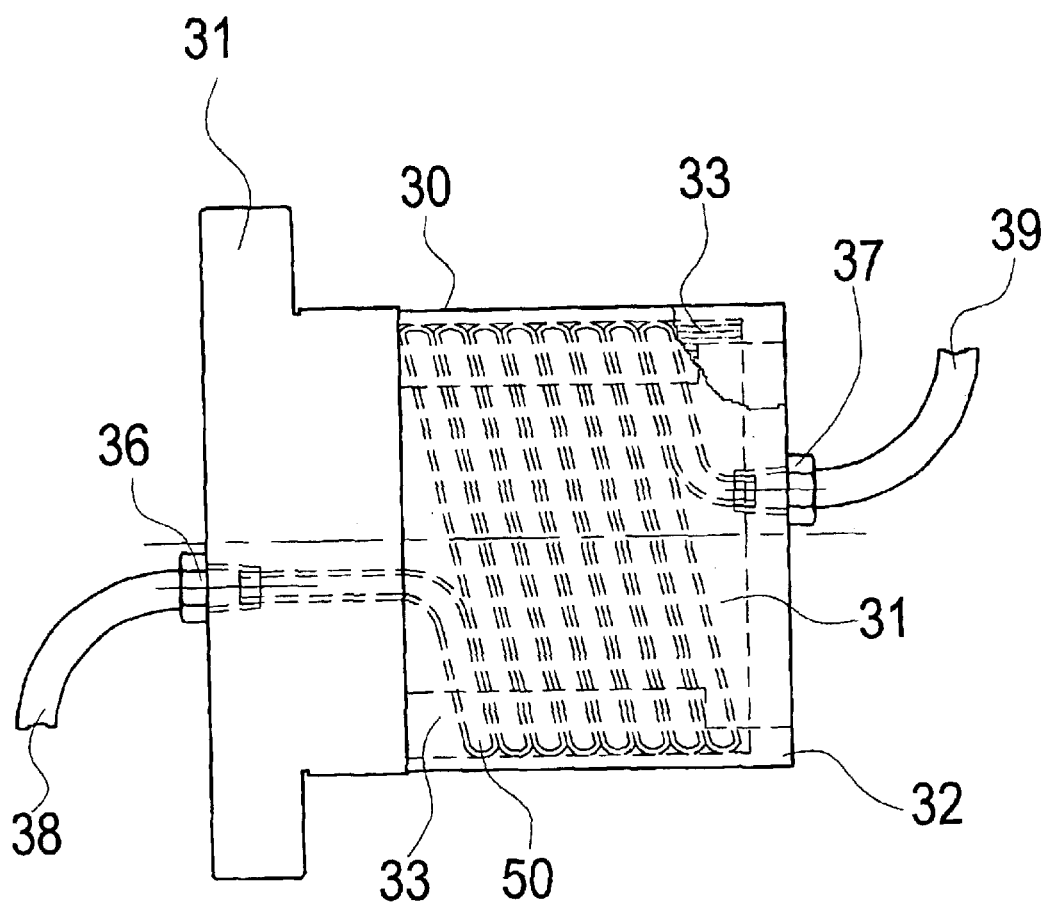
FIG. 5 is a schematic view of a ball screw with cooling means in a third embodiment of the present invention.

FIG. 5 is a schematic view of a third embodiment, in this embodiment a guiding tube 50 is spirally disposed in the cavity 33 such that the cooling agent is guided to circulate in the guiding tube 50 via the entrance and the exit openings 312 and 313 to perform its cooling function without directly in contact with outer covering 32 thereby eliminating the fear of cooling agent leakage and saving the installation of leakage proof element, such as the O-rings 34 and 35. For increasing thermal conductivity between the guiding tube 50 and the screw nut 31, a heat conducting glue 33' may be filled therebetween for a remedy.

It emerges from the above description that a far better cooling effect can be obtained by forming cooling means in the screw nut rather than in the screw bolt. Meanwhile, the design and fabrication of a ball screw assembly according to the present invention is quite easy by the reason that the outer cover and the screw nut are separately constructed.

It is therefore to be understood that the above and other modifications and changes may be readily made in the construction and arrangement of elements comprising the preferred and modified forms of invention without departing from the spirit and scope of the invention as defined by the appended claims and reasonable equivalents thereof.

What is claimed is:

1. A ball screw with cooling means comprising:

a. a screw bolt having a first spirally threaded groove formed around the outer surface thereof, b. a hollow screw nut to be sleeved over said screw bolt having a second spirally threaded groove corresponding to said first spirally threaded groove being formed around the inner surface thereof;

c. a plurality of rolling balls interposed between said first and second spirally threaded grooves so that said screw bolt and said screw nut are able to rotate with each other; and d. a spirally disposed guiding tube, a heat conducting glue and an outer cover covering said screw nut such that a cavity being formed between said screw nut and said cover for a cooling agent to flow through thereby reducing the temperature of said screw nut and wherein said spirally disposed guiding tube for guiding flow of the cooling agent is installed in said cavity to perform its cooling function without directly contacting said outer cover thereby eliminating cooling agent leakage and wherein said cavity is filled with said heat conducting glue between said guiding tube and said screw nut.

2. The ball screw of claim 1, wherein an entrance pipe with an opening and an exit pipe with an opening are formed in said screw nut for circulation of the cooling agent.

* * * * *